United States Patent [19]
Klein et al.

[11] 3,747,998

[45] July 24, 1973

[54] HIGH SPEED MAGNETIC SHAFT BEARING

[75] Inventors: Gerald Klein, Ruckersdorf; Gunther Vieweg, Nurnberg, both of Germany

[73] Assignee: Siemens Aktiengesellschaft, Munich, Germany

[22] Filed: Feb. 17, 1972

[21] Appl. No.: 227,571

[30] Foreign Application Priority Data
Feb. 23, 1971, Germany................. P 21 08 590.5

[52] U.S. Cl. ................................................. 308/10
[51] Int. Cl. ............................................. F16c 39/06
[58] Field of Search ....................................... 308/10

[56] References Cited
UNITED STATES PATENTS
| | | | |
|---|---|---|---|
| 3,614,181 | 10/1971 | Meeks | 308/10 |
| 3,216,655 | 11/1965 | Wind et al. | 308/10 X |
| 2,747,944 | 5/1956 | Baermann | 308/10 |

Primary Examiner—D. F. Duggan
Attorney—Hugh A. Chapin

[57] ABSTRACT

A bearing for substantially vertical shafts rotated at high speeds by electric motors or the like utilizes a spherical thrust bearing at the lower end of the shaft with an elastic radial bearing mounted on the upper portion of the shaft. The upper radial bearing comprises a magnetic radial bearing having a plurality of polarly magnetized annular or disc-like inner rings mounted adjacent to each other on the shaft and a plurality of polarly magnetized annular or disc-like outer rings separated from the inner rings by an air gap. The inner and outer rings are magnetically so disposed that they repel each other and thereby stabilize the shaft in the radial direction. An annular bearing member is also provided to cooperate with the magnetic radial bearing to prevent damage to the magnetic bearing because of excessive deflection of the shaft from its vertical position during the initial start up of the shaft.

11 Claims, 2 Drawing Figures 3,747,998

HIGH SPEED MAGNETIC SHAFT BEARING

FIELD OF THE INVENTION

This invention is concerned with bearings for shafts rotated at high speeds by electric motors or the like. As is well known, such high speed shafts find application in centrifuges, spinning machines, spinning buckets and the like.

BACKGROUND OF THE INVENTION

Generally ball bearings are used as the bearing support in high-speed shafts but at such extreme speeds, they are very noisy and are subject to relatively rapid wear. For these reasons, air bearings are also used for the bearing support of such high-speed shafts. Air bearings, however, require relatively high manufacturing costs as well as a separate supply of compressed air.

It is therefore an object of the preent invention to overcome these shortcomings of the prior art and provide a bearing for such high-speed shafts which permits the direct driving of the shaft by the rotor of a motor.

SUMMARY OF THE INVENTION

According to the present invention these objects are achieved by combining with a preferably vertically disposed shaft a thrust bearing at the lower end thereof and an elastic radial bearing as an upper collar bearing. With this combination the axis of rotation of the shaft can adjust itself to any imbalance caused in the mass axis of the system. This is not the case with ball bearings or with the conventional air bearings, due to the small bearing play that is provided with such bearings.

While an approriately designed air bearing can also be used as the radial bearing, due to the large air gap required, such a bearing consumes a considerable amount of air. Thus, we have found that a magnetic radial bearing is preferable.

We have also found that it is advantageous to use a magnetic radial bearing having a plurality of polarly magnetized annular or disc-like inner rings mounted adjacent to each other on the shaft. We also provide an equal number of annular or disc-like outer rings facing the inner rings but separated therefrom by an air gap. The outer annular rings are also polarly magnetized and arranged in such a manner that the inner and outer rings facing one another repel each other, and thereby stabilize the shaft in the radial direction. Because at extreme speeds considerable centrifugal forces occur in the disc-shaped inner rings connected to the shaft, it is advantageous to join the rotating magnetic inner rings to discs of high mechanical strength, mounted between the inner magnetic rings.

We have also found it particularly advantageous to design the lower thrust bearing as a spherical bearing to stabilize the upper magnetic bearing. By this combination, the magnetic bearing may also be used to relieve stress on the thrust bearing in the axial direction. To obtain axial relief of the thrust bearing, the outer magnetic rings, which are combined to form a unit, are provided with adjustability in the axial direction.

During the start up of the motor, because the shaft passes through a range of critical speeds, it is advisable at the upper end of the stationary part of the magnetic bearing to provide a so-called emergency annular bearing member which is preferably adapted to cooperate directly with the shaft. This emergency bearing permits less radial movement or bearing play than the magnetic bearing and thereby prevents damage to the magnetic bearing by excessive deflection of the shaft from its vertical position. It can be designed either as a sleeve bearing or as a ball bearing and it is advantageous to provide the emergency bearing with damping in the radial direction.

DESCRIPTION OF THE PREFERRED EMBODIMENT

Figure 1:
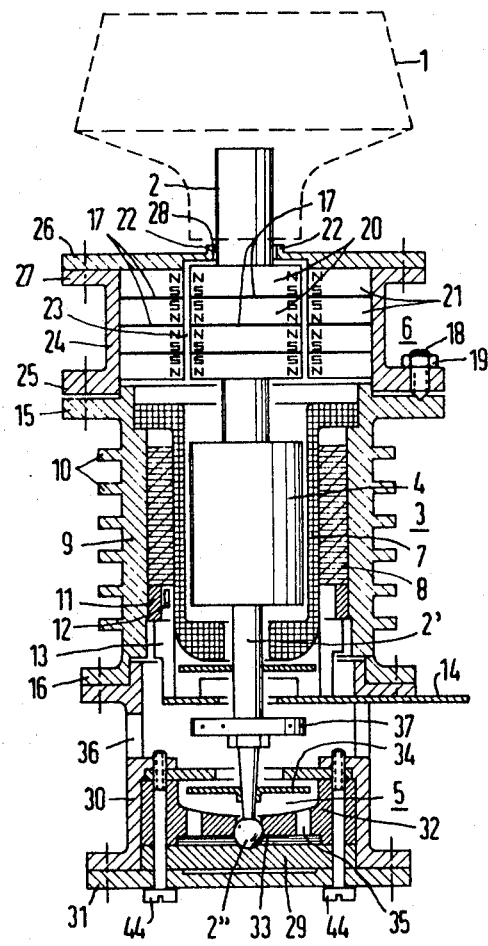
FIG. 1 is a partial cross-sectional view of a centrifuge shaft driven by an electric motor and embodying the bearings of the present invention.

Referring now to the Figures, there is shown in FIG. 1 a centrifuge bucket 1 attached to a vertical shaft 2. The shaft 2 is driven directly at very high speed by a motor 3 or its rotor 4 which is preferably a permanent-magnet rotor made of Alnico. The vertically disposed shaft 2 has its lower end centered by means of a thrust bearing, generally designated 5. At the upper end of the shaft 2 a magnetic radial bearing generally designated 6 is located.

The drive motor is preferably a motor with an electronic commutator, having a bell-shaped stator winding 7 surrounding the rotor 4 and located within a magnetic return yoke 8 consisting of stacked ferromagnetic circular rings. As is well known in the art, the stator winding 7 may consist of several winding circuits, for example, four such circuits. Further the winding circuits 7 and the magnetic return yoke 8 are preferably embedded in casting resin, which for the sake of clarity is not shown in FIG. 1. The stator winding 7 and the magnetic return yoke 8 are mounted in a hollow cylindrical housing 9 having cooling fins 10 on the outside thereof. A ferromagnetic ring 11 is located at the lower end of the magnetic return yoke 8 and centered in the housing 9. Within the ring 11 two cutouts are provided at right angles to each other to hold two Hall-effect generators 12, which drive transistors or the like connected to the individual winding circuits 7. A terminal board 14 for the motor control is attached and brought to the outside through longitudinal ribs 13.

At each end of the motor housing 9 there are flanges 15 and 16, with the magnetic radial bearing 6 connected to the upper flange 15 and the thrust bearing 5 connected to the lower flange 16. Within the magnetic radial bearing 6 arranged on the shaft 2 are a group of annular or disc-shaped magnetic rings 20. The magnetic discs 20 are preferably radially magnetized and arranged on shaft 2 in such a manner that poles of the same polarity oppose each other. The disc-shaped magnetic rings 20 are surrounded by annular discs 21 which have the same thickness and magnetic polarity as the inner circular rings 20 but are separated therefrom by an air gap 23. Between the annular discs 20 and 21 there are thin, non-magnetic discs 17. Because the magnetic ring discs 20 are subjected to very high centrifugal forces at high speeds, it is advantageous that the discs 17 are of high mechanical strength and are cemented or securely fastened to the rotating magnetic rings 20. While the discs 20 are attached directly to the rotor shaft 2, the outer annular magnetic discs 21 are mounted within a housing 24 and are attached to flange 15 of the motor housing by means of flange 25. The housing 24 is sealed by a plate 26, bolted to the upper flange 27. Plate 26 has a ring shaped collar 22 at circular cutout 28, designed as a safeguard or emergency bearing for shaft 2. Because the air gap between shaft 2 and collar 22 is narrower than the air gap 23 between the magnetic rings 20 and 21, no damage will occur to the annular magnetic rings 20 and 21 when installed on a centrifuge shaft when it is being brought up to speed.

As shown in the right-hand side of FIG. 1, it is preferable to provide axial adjustment for the magnetic radial bearing or its outer magnetic rings 21 and thereby provide relief for the axial stress on the thrust bearing 5. As shown, the height of the magnetic rings is adjustable by means of adjusting screws 18 (of which only one is shown) arranged concentrically to the axis of the rotor shaft 2. A lock nut 19 is also provided for adjusting screw 18.

As is also illustrated in FIG. 1, the lower end 2' of shaft 2 is spherical. This spherical portion revolves in socket plate 29 which has a suitably shaped socket having a diameter somewhat larger than that of the sphere. The socket plate 29 is held in place within housing 30 by means of a cover plate 31 and screws 44. Surrounding the spherical end 2'' of the shaft 2 is a thrust bearing member 32 having a sufficient clearance to allow rotation of the shaft while securing the shaft from movement in the axial direction. Between socket plate 29 and thrust bearing member 32 is arranged a washer 33, for instance, a Nomex washer, which serves to lubricate the spherical portion 2'' of shaft 2 and also acts as an oil reservoir. Any oil that may leak out in an upward direction is dispersed by the centrifugal oil disc 34 and returns to the washer or disc 33 through openings 35. A balancing disc 37, mounted on shaft 2, is accessible through openings 36 in the housing of the thrust bearing 5.

Figure 2:
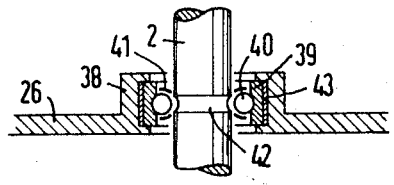
FIG. 2 is a partial cross-sectional view of an alternative embodiment of the emergency bearing of the present invention.

FIG. 2 illustrates an alternative embodiment for the safeguard or emergency bearing mounted at the upper end of the magnetic bearing 6. The upper cover plate 26 is modified with a collar 38, containing a ball bearing consisting of a ring-shaped member 39, ball bearings 40 and a cage 41. The rotor shaft 2 has a groove 42 adapted to cooperate wtih the ball bearing to secure the shaft 2 against movement in the axial direction.

In order to damp the emergency bearing in the radial direction, an elastic member 43, composed of a rubber ring or the like, is disposed between member 39 and collar 38. As mentioned previously, the emergency bearing serves to absorb resonant vibrations which occur when the shaft 2 is being brought up to speed.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A bearing for a rotatable substantially vertical high speed shaft comprising the combination of
   a thrust bearing mounted on the lower portion of the shaft and
   a collar bearing mounted on the upper portion of the shaft, the collar bearing being comprised of a magnetic radial bearing having a plurality of polarly magnetized disc-shaped inner rings mounted concentrically to the shaft and adapted to rotate with the shaft, said inner rings being mounted adjacent to each other; a plurality of identically polarized magnetic disc-shaped outer rings arranged concentrically to the shaft and the inner rings and separated from the inner rings by an air gap whereby the outer and inner rings facing each other magnetically repel each other to thereby stabilize the shaft against radial movement and a plurality of thin discs of high mechanical strength joined to each of the magnetic inner rings.

2. A bearing in accordance with claim 1 in which the outer magnetic rings are adapted to provide adjustable axial movement to relieve axial stress on the thrust bearing.

3. A bearing in accordance with claim 2 in which an annular bearing member is disposed adjacent the shaft in the upper portion of the magnetic radial bearing and is adapted to cooperate with the shaft to minimize radial movement of the shaft during the initial speeding up of the shaft.

4. A bearing in accordance with claim 3 in which the annular bearing member is adapted to provide an air gap between the shaft and the annular bearing member, the air gap being smaller than the air gap between the inner and outer magnetized rings of the bearing.

5. A bearing in accordance with claim 4 in which the annular bearing member is a ball bearing.

6. A bearing in accordance with claim 4 in which the annular bearing member has a damping member connected to it to dampen the radial movement of the shaft.

7. A bearing in accordance with claim 4 in which the annular bearing member is supported by means of a hollow resilient cylindrical member to provide damping in the radial direction.

8. A bearing in accordance with claim 2 in which the thrust bearing is a spherical bearing.

9. A bearing in accordance with claim 8 in which the lower end of the shaft is spherical and rotates in a socket plate.

10. A bearing in accordance with claim 9 further comprising a thrust bearing member adapted to cooperate with the spherical end of the shaft to prevent the shaft from moving.

11. A bearing in accordance with claim 10 further comprising a centrifugal oil disc mounted to the lower portion of the shaft above the thrust bearing to prevent escapement of lubricating oil from the thrust bearing.

* * * * *